United States Patent [19]

Ito et al.

[11] 4,205,637

[45] Jun. 3, 1980

[54] ELECTRONIC FUEL INJECTION SYSTEM FOR AN INTERNAL COMBUSTION ENGINE HAVING ELECTROMAGNETIC VALVES AND A FUEL DAMPER UPSTREAM THEREOF

[75] Inventors: Hiroshi Ito, Nagoya; Takeo Miyoshi, Toyota, both of Japan

[73] Assignee: Toyota Jidosha Kogyo Kabushiki Kaisha, Toyota, Japan

[21] Appl. No.: 9,931

[22] Filed: Feb. 5, 1979

Related U.S. Application Data

[63] Continuation of Ser. No. 802,561, Jun. 1, 1977, abandoned.

[30] Foreign Application Priority Data

Dec. 13, 1976 [JP] Japan ................................ 51-167688

[51] Int. Cl.[2] .......................... F01B 3/00; F16L 55/04

[52] U.S. Cl. ....................... 123/32 AE; 123/139 AW; 138/30

[58] Field of Search .................. 123/32 AE, 139 AW; 137/207; 138/30, 42

[56] References Cited

U.S. PATENT DOCUMENTS

| | | | |
|---|---|---|---|
| 2,676,617 | 4/1954 | Felger | 138/30 |
| 2,683,418 | 7/1954 | Smith, Jr. | 123/139 AW |
| 3,412,718 | 11/1968 | Long | 123/139 AW |
| 3,507,263 | 4/1970 | Long | 123/32 AE |
| 3,514,074 | 5/1970 | Self | 138/42 |
| 3,563,275 | 2/1971 | Sombardier | 138/30 |
| 3,853,147 | 12/1974 | Cibulka | 138/30 |
| 3,863,972 | 3/1975 | Zirps | 138/30 |

*Primary Examiner*—Ronald H. Lazarus
*Assistant Examiner*—P. S. Lall
*Attorney, Agent, or Firm*—Stevens, Davis, Miller & Mosher

[57] ABSTRACT

An electronic fuel injection system for an internal combustion engine, whereby fuel is introduced into the engine under controlled pressure through electro-magnetic valves at a flow rate controlled in accordance with the opening duration of the electro-magnetic valves. A fuel damper is provided in the fuel line upstream of all the electro-magnetic valves for leveling the pulsation of fuel pressure.

2 Claims, 16 Drawing Figures

Fig 6

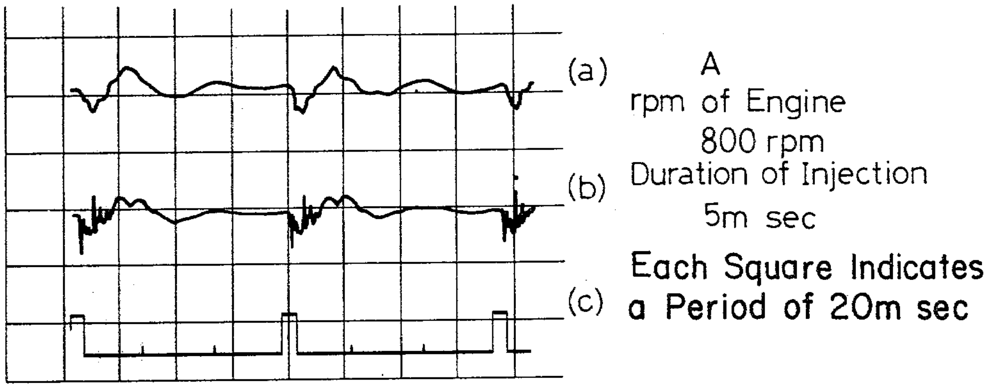

a = FUEL PRESSURE UPSTREAM OF THE ENGINE AT THE JUNCTION BETWEEN FLEXIBLE PIPE 18 AND FUEL PIPE 16 b = FUEL PRESSURE AT THE JUNCTION BETWEEN INJECTOR 44 AND PIPE 42 c = DURATION OF FUEL INJECTION ACCOMPLISHED BY OPENING VALVES 22

Fig 7

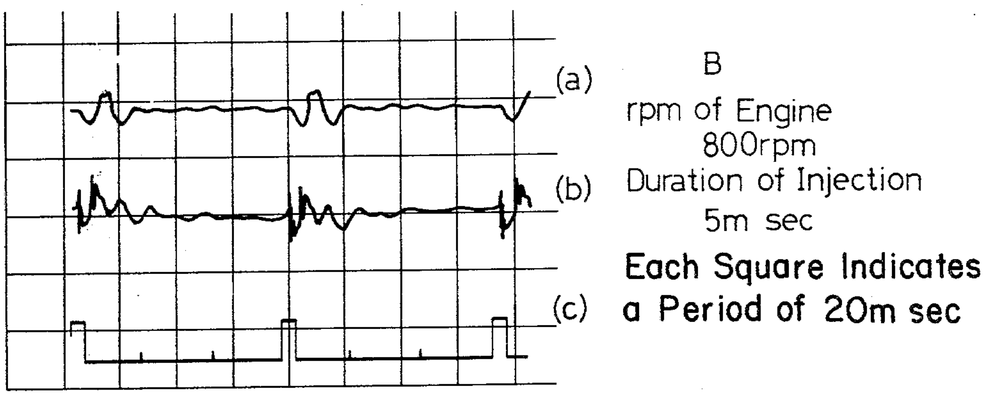

a = FUEL PRESSURE UPSTREAM OF THE ENGINE AT THE JUNCTION BETWEEN FLEXIBLE PIPE 18 AND FUEL PIPE 16 b = FUEL PRESSURE AT THE JUNCTION BETWEEN INJECTOR 44 AND PIPE 42 c = DURATION OF FUEL INJECTION ACCOMPLISHED BY OPENING VALVES 22

Fig 8

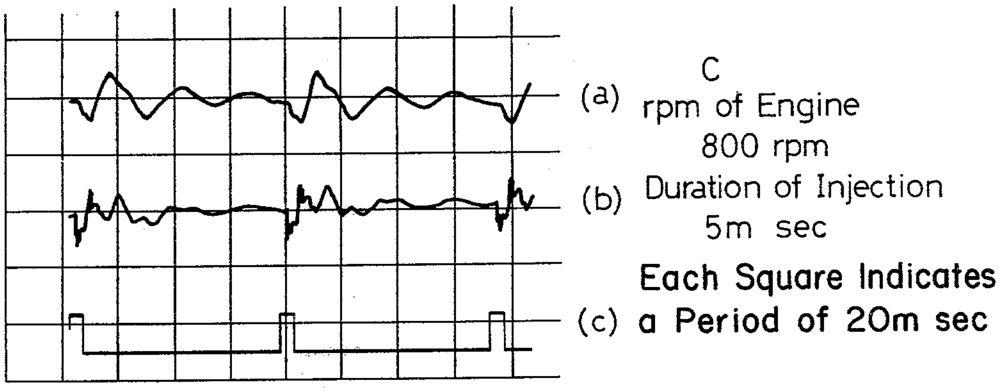

a = FUEL PRESSURE UPSTREAM OF THE ENGINE AT THE JUNCTION BETWEEN FLEXIBLE PIPE 18 AND FUEL PIPE 16 b = FUEL PRESSURE AT THE JUNCTION BETWEEN INJECTOR 44 AND PIPE 42 c = DURATION OF FUEL INJECTION ACCOMPLISHED BY OPENING VALVES 22

Fig 9

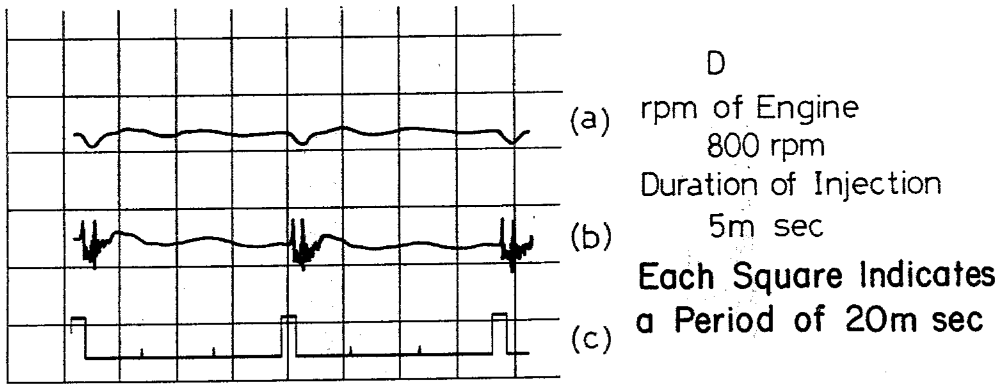

a = FUEL PRESSURE UPSTREAM OF THE ENGINE AT THE JUNCTION BETWEEN FLEXIBLE PIPE 18 AND FUEL PIPE 16 b = FUEL PRESSURE AT THE JUNCTION BETWEEN INJECTOR 44 AND PIPE 42 c = DURATION OF FUEL INJECTION ACCOMPLISHED BY OPENING VALVES 22

Fig 10

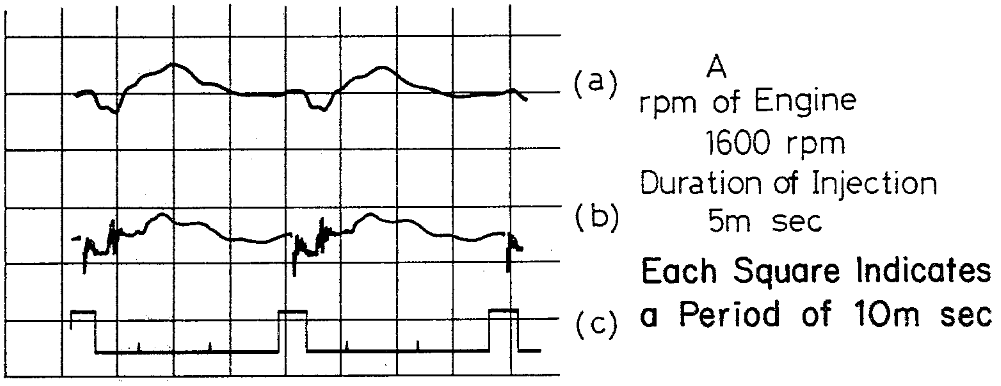

a = FUEL PRESSURE UPSTREAM OF THE ENGINE AT THE JUNCTION BETWEEN FLEXIBLE PIPE 18 AND FUEL PIPE 16 b = FUEL PRESSURE AT THE JUNCTION BETWEEN INJECTOR 44 AND PIPE 42 c = DURATION OF FUEL INJECTION ACCOMPLISHED BY OPENING VALVES 22

Fig 11

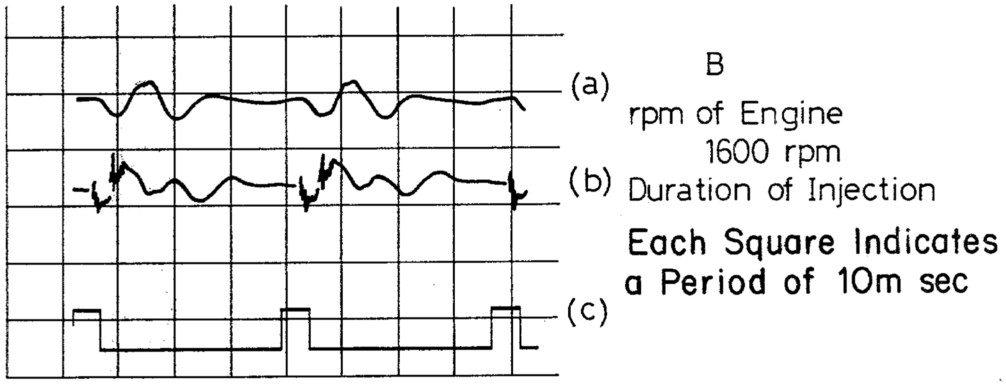

a = FUEL PRESSURE UPSTREAM OF THE ENGINE AT THE JUNCTION BETWEEN FLEXIBLE PIPE 18 AND FUEL PIPE 16 b = FUEL PRESSURE AT THE JUNCTION BETWEEN INJECTOR 44 AND PIPE 42 c = DURATION OF FUEL INJECTION ACCOMPLISHED BY OPENING VALVES 22

Fig 12

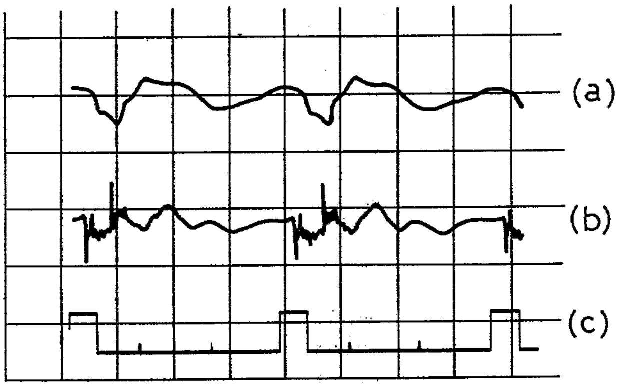

C
rpm of Engine
1600 rpm.
Duration of Injection
5m sec
Each Square Indicates a Period of 10m sec = FUEL PRESSURE UPSTREAM OF THE ENGINE AT THE JUNCTION BETWEEN FLEXIBLE PIPE 18 AND FUEL PIPE 16

= FUEL PRESSURE AT THE JUNCTION BETWEEN INJECTOR 44 AND PIPE 42

= DURATION OF FUEL INJECTION ACCOMPLISHED BY OPENING VALVES 22

Fig 13

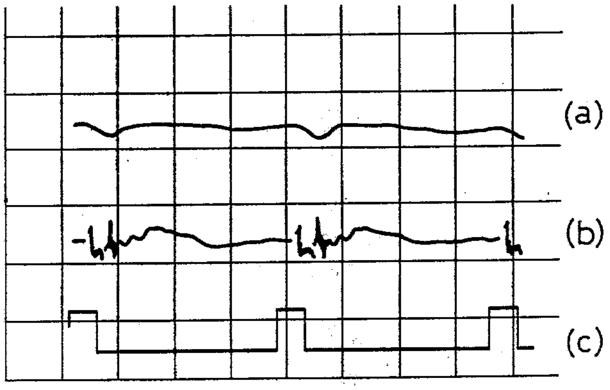

D
rpm of Engine
1600 rpm
Duration of Injection
5m sec
Each Squae Indicates a Period of 10m sec a = FUEL PRESSURE UPSTREAM OF THE ENGINE AT THE JUNCTION BETWEEN FLEXIBLE PIPE 18 AND FUEL PIPE 16 b = FUEL PRESSURE AT THE JUNCTION BETWEEN INJECTOR 44 AND PIPE 42 c = DURATION OF FUEL INJECTION ACCOMPLISHED BY OPENING VALVES 22

ELECTRONIC FUEL INJECTION SYSTEM FOR AN INTERNAL COMBUSTION ENGINE HAVING ELECTROMAGNETIC VALVES AND A FUEL DAMPER UPSTREAM THEREOF

This is a continuation of application Ser. No. 802,561 filed June 1, 1977, now abandoned.

BACKGROUND OF THE INVENTION

This invention relates to an electronic fuel injection system for an internal combustion engine, especially a system for absorbing pulsation of fuel pressure.

There is known an electronic fuel injection system for delivering an appropriate amount of fuel to an internal combustion engine. In the system, the fuel controlled, for example, at a pressure 2.55 $Kg/cm^2$ higher than that at the intake manifold is supplied through an electromagnetic valve, and the flow rate of the fuel is regulated by changing the width of an electric pulse transmitted to the electro-magnetic valve to alter the opening duration of the valve. Such a system is disclosed in many documents, such as SAE Paper No. 750,368, and is actually used on an automobile engine, such as of M-EU model (designation registered with the Japanese Ministry of Transportation) manufactured by the assignee company of this invention. The detailed construction of the engine is described in M-EU ENGINE REPAIR MANUAL published by TOYOTA MOTOR SALES CO., LTD. on Sept. 25, 1975, and its basic principles are already known to the public. As the electro-magnetic valve causes fuel to flow intermittently, the so-called "water hammer phenomenon" appears in the fuel pipe, bringing about pulsation of fuel pressure, undesirable fluctuations in the fuel-air ratio and abnormal noises. Therefore, the system is provided with a fuel damper in order to absorb the pulsation of fuel pressure.

SUMMARY OF THE INVENTION

An object of this invention is to provide, for an automobile engine carrying an electronic fuel injection system, a fuel damper which can efficiently absorb pulsation of fuel pressure produced in a fuel pipe leading to the engine.

Another object of this invention is to provide, for an automobile engine carrying an electronic fuel injection system, a fuel damper which can prevent vibration of the fuel pipe and the automobile body, and reduces noise from the body, which would all otherwise be caused by pulsation of fuel pressure.

A further object of this invention is to facilitate selection of the optimum position of such a fuel damper in the fuel pipe for its most efficient operation.

BRIEF DESCRIPTION OF THE DRAWINGS

FIGS. 6 to 13 are graphic views showing the results of the experiments for demonstrating the efficiency of this invention in absorbing pulsation of fuel pressure as compared with the prior art devices.

DETAILED DESCRIPTION OF THE INVENTION

Figure 1:
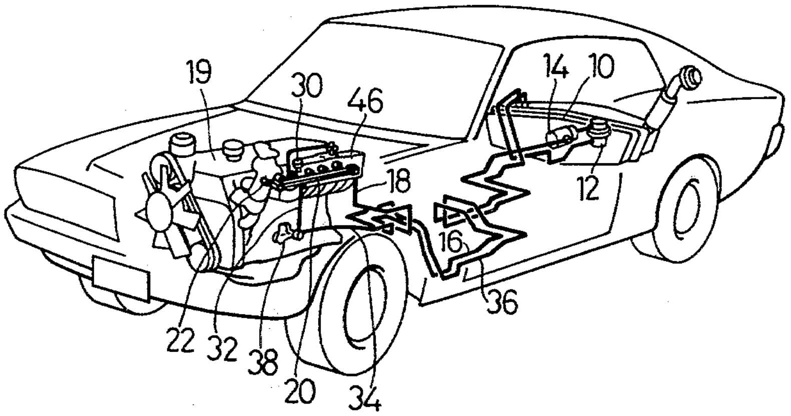
FIG. 1 is a schematic perspective view of an automobile showing the position of a fuel supply system with an electronic fuel injection system.

In FIG. 1 showing a fuel supply system with an electronic fuel injection system carried on an automobile, fuel flows from a fuel tank 10 in the rear part of the automobile body toward the engine 19 through a filter 12 a fuel pump 14, a high pressure fuel pipe 16 on the body and a flexible pipe 18 extending between the body and the engine. As is shown in detail in FIG. 2, the fuel supplied to the engine flows from a delivery pipe 20 through branch pipes 24 into electro-magnetic valves 22 each provided for one of six engine cylinders. The fuel is, then, injected from the electro-magnetic valves 22 into the intake manifold of the engine. The delivery pipe 20 is provided with another branch pipe 26 which is connected through a flexible pipe 28 to a pressure regulator 30 provided for maintaining the fuel pressure in the delivery pipe 20 at a predetermined value and recirculating excess fuel into the fuel tank 10 through flexible pipes 32 and 34 and a fuel recirculating pipe 36 on the body. The flexible pipes 32 and 34 and are supported on the engine 19 by a bracket 38. The delivery pipe 20 is provided with a branch pipe 40 which is connected through a flexible pipe 42 to a cold start injector 44 for supplying fuel thereto. When the engine is to be started from cold, fuel is injected from the cold start injector 44 into a surge tank 46 upstream of the intake manifold in order to provide an optimum fuel-air mixture for each cylinder.

Figure 2:
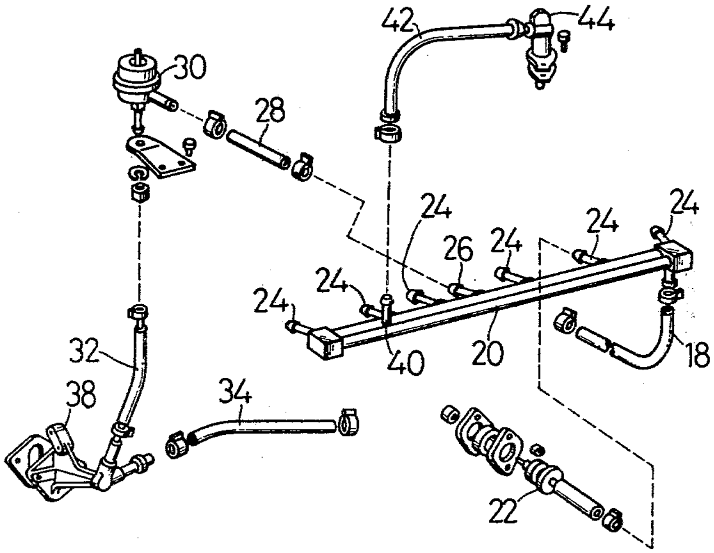
FIG. 2 is an exploded perspective view of the fuel supply system shown in FIG. 1.
Figure 3A:
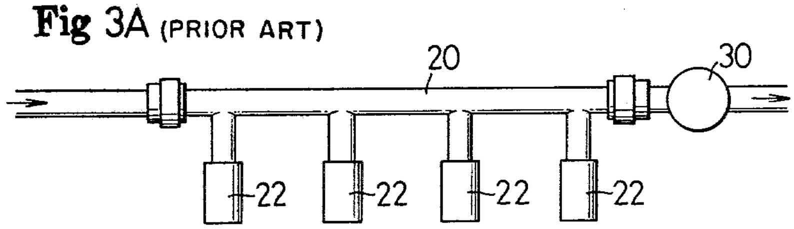
Fig 3A (PRIOR ART)
FIGS. 3A, 3B and 3C are diagrammatic views in top plan of the fuel supply systems known in the art.
Figure 3B:
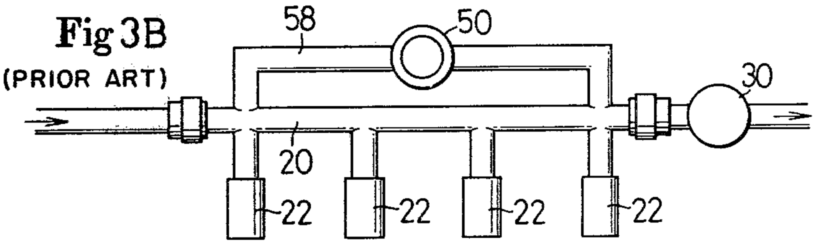
Fig 3B (PRIOR ART)
Figure 3C:
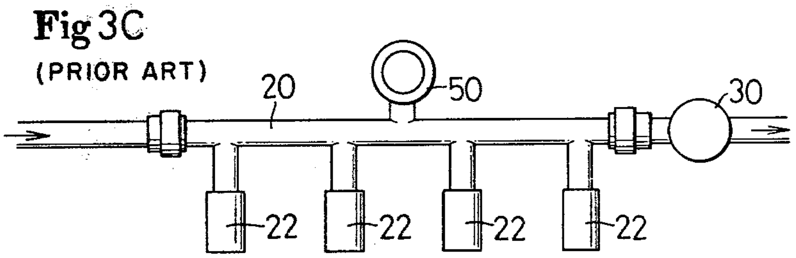
Fig 3C (PRIOR ART)
Figure 3D:
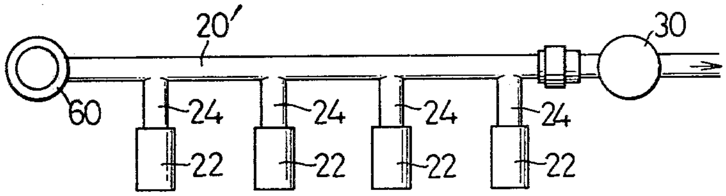
FIG. 3D is a similar diagrammatic view of the fuel supply system embodying this invention.
Figure 4:
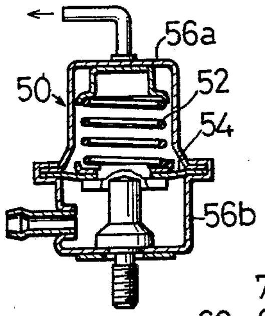
FIG. 4 is a longitudinal sectional view of a known fuel damper.

In the fuel supply system having an electronic fuel injection system, the electronic fuel injection system is, in some cases, provided with a fuel damper for absorbing pulsation of fuel pressure as mentioned above. Various positions of the fuel damper in respect of the electronic fuel injection system are shown in FIGS. 3B, 3C and 3D, in which there are shown only four electromagnetic valves one for each of four cylinders merely for the sake of simplicity. FIG. 3A shows an electronic fuel injection system with no fuel damper, which is employed in FIGS. 1 and 2. FIG. 3B shows a known device in which a fuel damper 50 shown in FIG. 4 is provided in the mid-portion of a branch fuel pipe 58 extending in parallel to the delivery pipe 20 and spanning the electromagnetic valves 22. The fuel damper is, as is shown in FIG. 4, provided with upper and lower housings **56*a* and 56*b* and a diaphragm 54 therebetween, and a spring 52 is provided in the upper housing 56*a* absorbing pulsation of fuel pressure in the lower housing 56*b*. FIG. 3C shows another known arrangement in which the fuel damper 50 is directly connected to the delivery pipe 20** in the mid-portion thereof. In the arrangements of FIGS. 3B and 3C, pulsation of fuel pressure cannot be satisfactorily absorbed, but causes vibration of the fuel pipe, which vibration is transmitted to the body through the junction between the high pressure fuel pipe and the body, causing noise.

Figure 5:
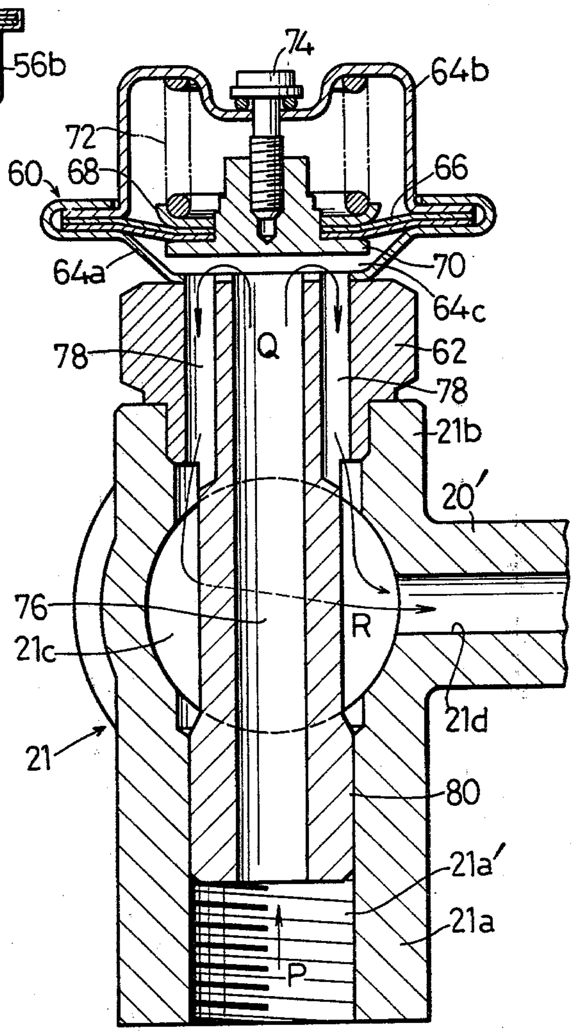
FIG. 5 is a longitudinal sectional view of a fuel damper of this invention in combination with a delivery pipe.

Now, a preferred embodiment of this invention which will overcome the disadvantages of these known arts will be described in reference to FIGS. 3D and 5. In FIG. 3D, a fuel damper 60 is provided at the entrance to the delivery pipe 20' upstream of all electro-magnetic valves 22. FIG. 5 shows construction of the fuel damper 60 connected to the delivery pipe 20'. The delivery pipe 20' is provided at the entrance end thereof with a joint member 21 having two oppositely projecting cylindrical extensions 21*a* and 21*b*. The joint member 21 is integrally connected to the delivery pipe 26 at right angles thereto and has an enlarged spherical hollow space 21*c* in its junction with the pipe 20'. The cylindrical extension 21*a* is connected to the flexible fuel pipe 18 to permit fuel flow in the direction indicated by an arrow P. The other cylindrical extension 21*b* is connected to the full admission type fuel damper 60. The fuel damper 60 comprises a body 62, a lower housing 64*a* connected to the body 62 and an upper housing 64*b* fixed to the lower housing 64*a* by flanges. A diaphragm 66 is held between the housings 64*a* and 64*b* at its outer periphery and supported by a spring seat 68 and a valve 70 at the center thereof. A spring 72 carried on the spring seat 68 urges the diaphragm 66 downward. An adjust screw 74 is threadedly connected with the valve 70 to adjust the force of the spring 72 against the diaphragm 66 to control the capacity of the damper 60 to absorb the pulsation of fuel pressure. The body 62 has a central fuel passage 76 extending along its entire length and a plurality of holes 78 are provided around the central fuel passage 76 for permitting fuel flow between a chamber 64*c* defined by the housing 64*a* and the hollow space 21*c*. The body 62 is externally threaded at its lower end portion 80, at which the body 62 is threadedly connected into the lower end portion 21*a'* of the cylindrical extension 21*a* in a gas-tight manner, so that no fuel flowing in the direction of the arrow P will be introduced directly into the hollow space 21*c*. The fuel flows from the cylindrical extension 21*a* into the inner fuel passage 76 in the direction of the arrow P, and then, as arrows Q indicate, through the chamber 64*c* and the holes 78 into the hollow space 21*c*, from where the fuel flows into the axial bore 21*d* of the delivery pipe 20', and then, as shown in FIG. 2, through the branch pipes 24 into the electromagnetic valves 22.

The pulsation of fuel pressure caused by the operation of the electro-magnetic valves 22 is reversely transmitted through the axial bore 21*d*, the hollow space 21*c* and the holes 78 into the chamber 64*c*, wherein the pulsation is absorbed by the spring 72 and is not transmitted to the upstream fuel pipe.

Comparative experiments were performed to ascertain the improved efficiency of the apparatus according to this invention over the prior art devices. The following measuring apparatuses were employed in the experiments:

1. Semiconductor compact pressure converter made by Toyoda Machine Works, Ltd. (Japan)
2. Direct current amplifier by Toyoda Machine Works, Ltd.
3. Memory scope by Sony Techtronics (Japan)

The results of the experiments are shown in FIGS. 6 to 13, in which the reference letters A, B, C and D indicate the apparatuses shown in FIGS. 3A (prior art), 3B (prior art), 3C (prior art) and 3D (invention), respectively. Curve a in each graph illustrates the fuel pressure upstream of the engine at the junction between the flexible pipe 18 and the high pressure fuel pipe 16. Each square in each graph is dimensioned to indicate a fuel pressure of 0.39 $Kg/cm^2$. Curve b in each graph illustrates the fuel pressure measured at the junction between the cold start injector 44 and the flexible pipe 42.

Each square in each graph represents a fuel pressure of 0.39 $Kg/cm^2$. Curve c in each graph illustrates the duration of each fuel injection accomplished by opening the valves 22. In FIGS. 6 to 9 representing the situation in which the engine is idling at 800 rpm, each square indicates a period of 20 msec, and in FIGS. 10 to 13 in which the engine operates at 1600 rpm to drive the automobile at a speed of 40 km/h, each square represents a period of 10 msec.

It will readily be understood from the results of the experiments that this invention is quite effective for leveling the pulsing fuel pressure upstream of the delivery pipe in the flexible pipe 18 and the high pressure fuel pipe 16 on the body.

What is claimed is:

1. In an electronic fuel injection system for an internal combustion engine for an automobile having electro-magnetic valves through which fuel is introduced into said engine under controlled pressure, a substantially straight fuel delivery pipe having an inlet end and an outlet end, said electro-magnetic valves being spaced along the longitudinal axis of said fuel delivery pipe, another fuel pipe fluidly connected to the inlet end of said fuel delivery pipe, and a fuel pump fluidly connected to said another fuel pipe, the improvement which comprises:

a fuel damper upstream of all of said electro-magnetic valves;

a joint member on the inlet end of said fuel delivery pipe, said joint member comprising two coaxial cylindrical extensions extending in opposite directions from said fuel delivery pipe and terminating in opposite ends;

one end of said joint member being fluidly connected to said another fuel pipe;

said fuel damper extending into said joint member from the other end thereof to adjacent the one end thereof and closing said other end, said fuel damper comprising a diaphragm extending transverse to and spaced from the other end of said joint member, a valve member secured to said diaphragm and facing said other end of said joint member, and a spring biasing said diaphragm and said valve member toward said other end of said joint member;

means defining a first single longitudinally extending central passage through said damper, said passage extending from adjacent the one end of said joint member and terminating in an end immediately facing said valve member;

means defining a second longitudinally extending passage for fuel in said damper and between said damper and said joint member, said second passage being transversely outwardly of said first passage and also having an end immediately facing said valve member and fluidly communicating said first passage with said fuel delivery pipe.

2. In an electronic fuel injection system for an internal combustion engine for an automobile having electro-magnetic valves through which fuel is introduced into said engine under controlled pressure, a substantially straight fuel delivery pipe having an inlet end and an outlet end, said electro-magnetic valves being spaced along the longitudinal axis of said fuel delivery pipe, another fuel pipe fluidly connected to the inlet end of said fuel delivery pipe, and a fuel pump fluidly connected to said another fuel pipe, the improvement which comprises:

a fuel damper upstream of all of said electro-magnetic valves;

a joint member on the inlet end of said fuel delivery pipe, said joint member comprising two coaxial cylindrical extensions extending in opposite directions from said fuel delivery pipe and terminating in opposite ends, one end of said joint member being fluidly connected to said another fuel pipe;

said fuel damper having an extension extending into said joint member from the other end thereof and closing said other end, said fuel damper comprising a diaphragm extending transverse to and spaced from the other end of said joint member, a valve member secured to said diaphragm and facing said other end of said joint member, and means biasing said diaphragm and said valve member toward said other end of said joint member;

means defining a first single longitudinally extending central passage for fuel through said extension of said damper, said passage terminating in an end immediately facing said valve member;

means defining a second longitudinally extending passage for fuel in said damper and between said extension and said joint member, said second passage being transversely outwardly of said first passage and also having an end immediately facing said valve member and fluidly communicating said first passage with said fuel delivery pipe.

* * * * *